Aug. 16, 1949.   G. B. LONG   2,479,047
CONTROL
Filed Oct. 30, 1944
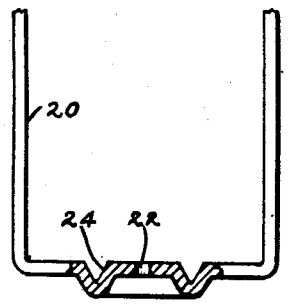
Fig. 2.
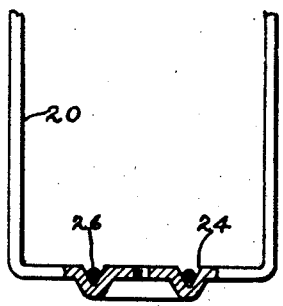
Fig. 3.
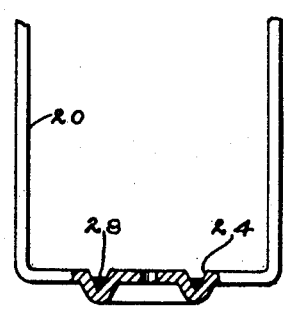
Fig. 4.
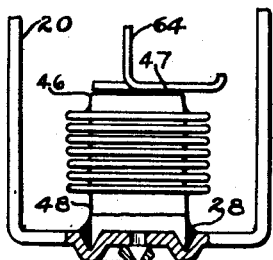
Fig. 7.
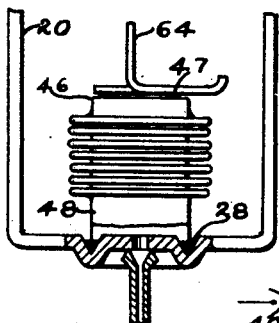
Fig. 6.
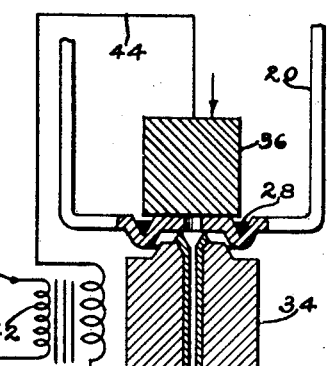
Fig. 5.
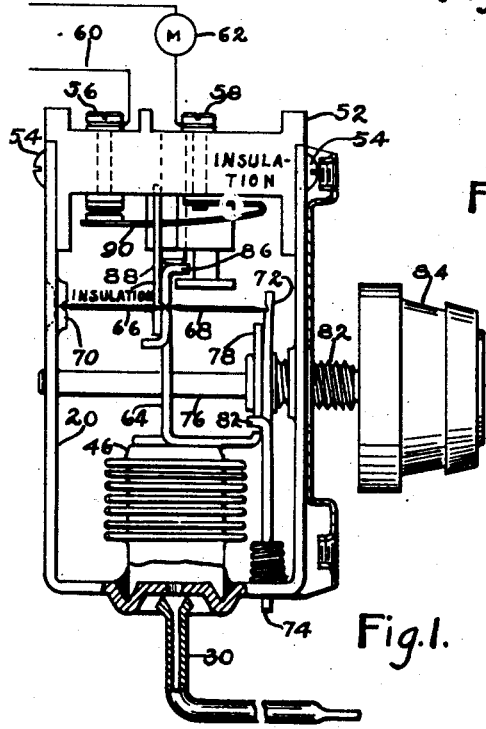
Fig. 1.
Fig. 8.
Fig. 9.
INVENTOR.
George B. Long
BY Spencer Hardman and Fehr
attorneys

UNITED STATES PATENT OFFICE 2,479,047

CONTROL

George B. Long, Dayton, Ohio, assignor to General Motors Corporation, Dayton, Ohio, a corporation of Delaware Application October 30, 1944, Serial No. 561,094

3 Claims. (Cl. 200—83)

This invention relates in one specific aspect to refrigerating apparatus, but more properly to a control provided with an improved bellows frame and tube construction, and to a method of joining the bellows frame and tube.

In controls it has been customary to spin the open end of the bellows over a flange on an apertured screw-threaded part and then solder the spun joint to seal the bellows. The screw-threaded part is clamped by a clamping nut to the support or frame. A capillary tube is soldered in the aperture in the screw-threaded part to provide a pressure connection to the interior of the bellows. An example of this construction is illustrated in the Grooms Patent 2,231,532. In this construction the screw-threaded part and nut, as well as the fabrication costs are rather high. It is also customary to solder or spot weld the bellows follower to the bellows.

It is an object of my invention to provide a durable construction of a bellows, bellows follower, frame and tube which can be manufactured in large quantities at a low material and labor cost.

It is another object of my invention to provide a durable construction of bellows, bellows follower, frame and tube for which automatic machinery may be readily adapted for its manufacture.

It is another object of my invention to provide a durable construction of bellows, frame and tube in which the fluxes are readily removed.

It is another object of my invention to provide a durable construction of bellows, frame and tube in which a perfect seal is readily obtained so that very few will be rejected on account of leaking either during manufacturing or at any time thereafter.

It is another object of my invention to provide a durable construction of a bellows and bellows follower.

It is another object of my invention to provide an improved method of joining a bellows, frame and tube.

It is another object of my invention to provide an improved method of joining the frame and a tube.

It is another object of my invention to provide an improved method of joining a bellows and bellows follower.

It is still another object of my invention to provide an improved method of joining a copper tube to a steel, bronze or other metal member.

Essentially, these objects are attained by forming an annular groove surrounding a hole in the control frame, melting a ring of solder in the groove, washing away the flux, projection welding the tube to the frame concentric with the aperture, melting the solder and placing the bellows rim in the molten solder in the groove and applying flux to the outside of the bellows immediately above the molten solder and then washing away the flux. Previous to the soldering, the closed end of the bellows is provided with an annular projection on its upper surface and the bellows follower projection welded to it. The remainder of the construction of the control may be conventional.

Further objects and advantages of the present invention will be apparent from the following description, reference being had to the accompanying drawings, wherein a preferred form of the present invention is clearly shown.

In the drawings:

Fig. 1 is a view in elevation of a refrigerator control embodying my invention;

Fig. 2 is a fragmentary view showing the first step in forming the frame for the control;

Fig. 3 is a view similar to Fig. 2 showing the second step in the process for fastening the bellows to the fame;

Fig. 4 is a view similar to Fig. 3 showing the third step;

Fig. 5 is a view illustrating diagrammatically the projection welding of the tube to the frame;

Fig. 6 is a view similar to Figs. 2 to 4 showing the placing of the bellows in the molten solder;

Fig. 7 is a view showing the disposition of the solder at the completion of the assembly;

Fig. 8 is an enlarged view of the tube to be fastened to the frame; and

Fig. 9 is a view of the ring of solder shown in Fig. 3.

In controls, it is customary to support a bellows upon a frame and to connect a source of fluid pressure with the interior of the bellows by a tube. The frame supports the control device, such as a switch or a valve and the movable end of the bellows is operatively connected to the switch mechanism or valve, so as to open and close the switch or the valve in accordance with changes in pressure within the bellows. Often more than a single set of switches or valves is operated.

According to my invention in the steel frame 20 I pierce a small hole 22. Concentric with the hole 22 I form an annular V-shaped groove 24. This hole 22 and groove 24 may be formed separately but preferably are formed simultaneously by a combined piercing and pressing operation. Preferably these operations are performed at the same time as other operations on the frame 20.

Following this piercing and forming operation shown in Fig. 2, I take a ring of solder wire 26, shown in Fig. 9, which is formed exactly to the diameter of the groove 24 and place it in the groove 24 as shown in Fig. 3, either before or after the groove 24 or the ring 26 of solder wire is fluxed. However, if desired the so-called acid core solder wire containing a suitable flux may be used instead of applying the flux directly.

Following this, the frame 20, or at least that portion of the frame containing the groove 24, is heated until the solder ring 26 melts to form the pool of solder 28 in the bottom of the groove. Then the groove is washed with a suitable solvent for the flux, ordinarily water, which removes the flux and solidifies the solder in the bottom of the groove. By this arrangement the solder is firmly bonded to the bottom of the groove. For convenience, I prefer to attach the copper capillary tubing to the steel frame after the solder has solidified in the bottom of the groove as just described. However, this attaching of the tube to the frame may be performed at any time after the first step illustrated in Fig. 2, either between or after or during any of the other steps.

I prepare the capillary tubing by chamfering the end thereof so that the inner and outer walls at the end of the tubing are at an angle of 30° providing an included angle of 60°, as shown in Fig. 8. The edge formed by the 60° angle may be either sharp or with a small radius, such as .005 of an inch or it may be flattened a corresponding amount. Preferably the chamfering of the end of the tube is done by an upsetting operation, but any other type of operation providing a relatively sharp uniform edge perpendicular to the axis of the tubing will be satisfactory if properly supported.

The chamfered end 32 of this tubing 30 is placed within a welding electrode 34 with the chamfered end 32 projecting up as shown in Fig. 5. The frame 20 is placed on the chamfered end 32 of the tube 30 with the aperture 22 concentric with the tube 30. The solder 28 is on the side of the frame opposite the tube 30. A second electrode 36 contacts the opposite side of the frame 20 from the tube 30 and the electrodes 34 and 36 are then forced toward each other preferably at a pressure of about 250 lbs. The switch 40 controlling the energization of the welding transformer 42 is then closed to cause a flow of current through the low voltage circuit 44 and particularly from the electrode 36 through the frame 20 to the chamfered end 32 of the tube 30 and the electrode 34. I prefer, at this projection pressure, to use four half cycles of current at 4 volts. However, satisfactory joining has been accomplished with other pressures, other voltages and other current times with either full or half cycles of current.

The frame 20 is preferably made of mild steel while the capillary tube 30 is preferably of copper. It has been considered that it is impractical to weld copper to steel by electric resistance or projection welding because of the extremely high eletcrical conductivity of the copper. However, I find by upsetting and flaring the end of the copper capillary tube to form a relatively sharp chamfered edge as shown in Fig. 8 that this weld can be accomplished in a very satisfactory manner to give a leak proof joint. Although this joint can be made by solder, the welded joint is more easily made and provides a more satisfactory joint. Metals other than copper may be used for this tube and the end may be similarly upset and welded. It is particularly desirable in that there are no fluxes required and consequently there are no difficulties or operations required to wash away the flux. The heat provided in the welding operation is sufficiently concentrated as to both place and time that it does not melt the solder 28.

In a sub-assembly step, the closed end of a brass or copper bellows 46 has an annular projection 47 formed in the upper surface of its closed end. This projection 47 preferably projects about 0.012 inch above the plane of the upper surface of the closed end of the bellows and is about $\frac{1}{16}$ inch wide. (The size is exaggerated in Figs. 6 and 7.) The bellows follower 64 is then projection welded to the annular projection 47 on the upper surface of the bellows 46. This projection weld is similar in principle to that shown in Fig. 5. A projection pressure of about 200 to 350 lbs., a voltage of about 2 to 4 volts and a time of about ½-6 cycles may be used.

For the next step the solder 28 is heated until it is melted or molten. A bellows 46 preferably of the configuration and having the bellows follower 64 previously attached to its closed upper end as shown in Fig. 6, is employed having an open lower end with a comparatively wide rim 48 having a diameter exactly equal to the diameter of the groove 24. The rim 48 of this bellows is placed in the molten solder 28 as shown in Fig. 6. The sharp V-shape of the groove 24 makes possible the accurate location of the bellows 46 in the frame so that it is accurately located both vertically and laterally. While the solder is still molten, in fact immediately after placing the bellows in the solder as shown in Fig. 6, flux is applied on the outside of the bellows to the solder in the groove or to the bellows immediately above the solder. The solder 28 forms a seal preventing the flux from getting inside the bellows 46. The application of the flux to the outside of the bellows causes the solder to rise on the outside of the bellows substantially as shown in Fig. 7. Substantially all the solder is drained from the inside of the bellows and goes to the outside of the bellows substantially filling the space between the outer wall of the groove and the outer wall of the rim 48 of the bellows 46.

Following this the solder 28 is washed with a suitable solvent, ordinarily water, to remove all the flux. Through this procedure the flux is always kept in a location where it may be easily washed away and it is prevented from getting inside the bellows where it might remain and cause corrosion and possible erratic operation of the control. The tubing 30 connects directly through the aperture 22, in the frame to the interior of the bellows 46 and the bellows 46 is firmly and accurately anchored to the frame. This construction provides a very excellent soldered joint between the bellows and frame forming a perfect seal which may be readily obtained with high volume, conveyor system mass production. Leaks found upon inspection or any time afterward should be extremely rare. No unnecessary parts are required. The screw-threaded part and nut used in former constructions are eliminated.

As an example of one application of this bellows, bellows follower, frame and tube construction to controls, I have shown in Fig. 1 a refrigerator control in which a block 52 of electrical insulating material is fastened by screws 34 between the upper ends of the frame 20. This insulating block 52 is provided with the terminals 56 and 58, the terminal 56 being connected to a supply conductor 60 while the terminal 58 is connected to an electric motor 62 which may be used for driving the compressor of a refrigerating system. The capillary tube 30 and the bellows 46 are preferably charged with a suitable vapor or volatile liquid, such as sulphur dioxide or methyl chloride. The closed end of the capillary tube 30 is clamped to the evaporator of a refrigerating system or exposed to whatever medium is to be used to govern the control desired. The rise and fall in temperature of the fluid in the capillary 30 causes vapor to be forced into and removed from the interior of the bellows 46.

On top of the bellows 46 is the bellows follower 64 extending upwardly and provided with a pair of notches receiving the hardened knife edges at the inner end of the toggle links 66 and 68. The frame 20 is provided with a boss 70 having a notch for receiving the hardened knife edge at the opposite end of the link 66. The hardened knife edge at the opposite end of the link 68 is supported in a notch in the upper end of a flat bar spring 72. The lower end of this spring bar has a tongue 74 projecting through a slot in the bottom of the U-shaped frame 20. The middle portion of the bar 72 is provided with a slot through which passes the shaft 76 which continues through a slot in the bellows follower 64 and is rotatably and slidably mounted in an aperture in the left side of the frame 20. A cam 78 is fixed to the shaft 76 by a spline connection and bears upon a projection 80 of the spring bar 72 by which the spring bar 72 may be raised and lowered. Beyond the spring bar 72 the shaft 76 is enlarged to provide a threaded portion 82 having a shoulder bearing against the spring bar 72. The frame 20 is extruded and threaded to receive the threaded portion 82. Beyond the threaded portion 82 the shaft 76 is provided with a knob 84 by which the tension of the spring bar 72 may be varied and simultaneously be moved upwardly or downwardly to change the effective force and location of the toggle arrangement.

The bellows follower 64 is provided with another projection 86 adapted to engage stop screws in either direction to limit the movement of the closed end of the bellows 46 and the bellows follower 64. The bellows follower 64 is connected by a member 88 of insulating material to a leaf spring 90 carrying a contact cooperating with a contact mounted upon the inner end of the terminal 56. The leaf spring 90 itself is anchored to the inner end of the terminal 58.

This illustrates how adaptable my bellows, bellows follower, frame and tube construction is to controls. Although I have shown it applied to a particular refrigerator switch it should be understood that it is applicable to all sorts of controls employing different types of supports or frames.

While the form of embodiment of the invention as herein disclosed, constitutes a preferred form, it is to be understood that other forms might be adopted, as may come within the scope of the claims which follow.

What is claimed is as follows:

1. A bellows-operated control comprising a metal frame provided with an aperture therein, a metal bellows having an open end extending over the aperture with the entire rim of its open end sealed directly to one side of the frame, a tube having an end adjoining the margin of said aperture and sealed to said frame, a control device supporting means carried by said frame, a control device supported by said supporting means and operatively connected to said bellows, said frame constituting a single piece of metal extending between the bellows and the tube and the supporting means.

2. A bellows-operated control comprising a steel frame having an aperture therein, a metal bellows having its open end extending over said aperture and the rim thereof sealed directly to one side of said frame, a copper tube having a chamfered end extending over said aperture on the opposite side of said frame and welded directly to the frame, a control device supporting means connected to said frame, a control device supported upon said supporting means and operatively connected to said bellows, said frame constituting a single piece of metal extending between the bellows and the tube and the supporting means.

3. A bellows-operated control comprising a metal frame having an aperture therein and an annular groove surrounding the aperture, a metal bellows having a rim of the same diameter as said groove at its open end extending into said annular groove, said groove containing solder extending between and forming a seal between the bellows rim and the frame, a tube having its end adjoining the margin of said aperture and bonded to said frame on the opposite side from the bellows, a control device supporting means carried by said frame, a control device supported by said supporting means and operatively connected to said bellows, said frame constituting a single piece of metal extending between the bellows and the tube and the supporting means.

GEORGE B. LONG.

REFERENCES CITED

The following references are of record in the file of this patent:

UNITED STATES PATENTS

| Number | Name | Date |
| --- | --- | --- |
| 1,705,622 | Mallory | Mar. 19, 1929 |
| 2,078,441 | Carlson | Apr. 27, 1937 |
| 2,119,317 | Dasher | May 31, 1938 |
| 2,127,685 | Gruelich | Aug. 23, 1938 |
| 2,184,241 | Newill | Dec. 19, 1938 |
| 2,200,599 | Gaynor | May 14, 1940 |
| 2,225,780 | Hastings | Dec. 24, 1940 |
| 2,231,532 | Grooms | Feb. 11, 1941 |
| 2,319,407 | Konochel et al. | May 18, 1943 |